United States Patent Office 2,734,073
Patented Feb. 7, 1956

1

2,734,073

ALPHA-(HALOMETHYL) NITROBENZYL NITRATES

Ludo K. Frevel and John W. Hedelund, Midland, Mich., assignors to The Dow Chemical Company, Midland, Mich., a corporation of Delaware No Drawing. Application June 2, 1952, Serial No. 291,303

9 Claims. (Cl. 260—466)

This invention relates to new benzyl nitrates and a process for preparing the same.

The present invention is directed to a process for producing alpha-(halomethyl)nitrobenzyl nitrate compounds with the general formula:

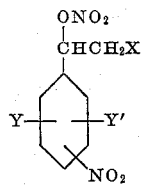

wherein X is a member of the group consisting of bromine and chlorine, and Y and Y' are independently selected from the group consisting of hydrogen, halogen, lower alkyl, and lower alkoxy, each of the said lower alkyl and lower alkoxy groups containing no more than 5 carbon atoms. The alpha-(halomethyl)nitrobenzyl nitrates of the invention are thermally unstable compounds, the para isomers of which are generalally white to light yellow solids melting below 150° C. These new compounds have utility as fungicides and are useful intermediates in the manufacture of antibiotic pharmaceuticals. The compound alpha-(bromomethyl)-para-nitrobenzyl nitrate is particularly desirable since it is readily converted to alpha-bromo-para-nitro-acetophenone according to the method disclosed by Monroe et al. in a co-pending application, Serial No. 291,316, filed simultaneously herewith on June 2, 1952. As therein disclosed, alpha-(bromomethyl)-para-nitrobenzyl nitrate is hydrolyzed with aqueous hydrohalic acid to alpha-(bromomethyl)-para-nitrobenzyl alcohol which is subsequently oxidized with chromic acid to alpha-bromo-para-nitroacetophenone. The latter compound is a starting material in the synthesis of the antibiotic chloramphenicol ("Chloromycetin") in the process of Long and Troutman described in J. A. C. S. 71, 2473–5 (1949).

The new products of the invention may be prepared by nitrating alpha-(halomethyl)benzyl alcohols corresponding to the following general formula:

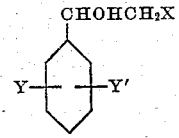

wherein X, Y, and Y' are as defined above.

Typical of these compounds are: alpha-(bromomethyl)-benzyl alcohol ($C_6H_5 \cdot CHOHCH_2Br$), alpha-(chloromethyl)benzyl alcohol ($C_6H_5 \cdot CHOHCH_2Cl$), and nuclearly substituted derivatives of these compounds, such as alpha-(chloromethyl)-o-methylbenzyl alcohol (ortho-$CH_3 \cdot C_6H_4 \cdot CHOHCH_2Cl$)

alpha-(bromomethyl) - m - ethylbenzyl alcohol (meta-$C_2H_5 \cdot C_6H_4 \cdot CHOHCH_2Br$); alpha - (bromomethyl) - o - methoxybenzyl alcohol

2

(ortho-$CH_3O \cdot C_6H_4 \cdot CHOHCH_2Br$)

alpha-(chloromethyl)-m-ethoxybenzyl alcohol (meta-$C_2H_5O \cdot C_6H_4 \cdot CHOHCH_2Cl$)

alpha-(bromomethyl)-2,5-dichlorobenzyl alcohol ($Cl_2 \cdot C_6H_3 \cdot CHOHCH_2Br$)

and alpha-(chloromethyl)-m-bromobenzyl alcohol (meta-$Br \cdot C_6H_4 \cdot CHOHCH_2Cl$)

According to the invention, the production of alpha-(halomethyl)nitrobenzyl nitrates comprises reacting the above-described alpha-(halomethyl)benzyl alcohols with a nitrating agent containing at least two molecular proportions of nitric acid for each mole of the organic compound to be nitrated. The nitration is generally conducted at a temperature below 50° C. When carrying out the nitration batchwise, the preferred method of operation is to add the benzyl compound to nitric acid. Usually a solvent inert to nitric acid under the conditions of the reaction is employed in the process. At the preferred conditions of the reaction, the nitration is readily controlled to give high conversions and yields of the nitrated products. Nitration of the benzene ring appears to be predominantly para when the part position of the ring is unsubstituted.

The nitrating agent employed in the process of the invention should preferably contain less than 10 weight per cent water since a larger proportion of water depresses ring nitration of alpha-(halomethyl)benzyl alcohol compounds. Essentially anhydrous nitric acid with less than 1 weight per cent water is a good nitrating agent for these compounds, although fuming nitric acid containing up to 10 weight per cent water may satisfactorily be employed. The nitrating agent may also consist of a mixture of concentrated nitric and sulfuric acid, the latter functioning as a dehydrating agent to counteract the water formed by the nitration reaction. Commercially available nearly anhydrous mixed acid containing approximately equal weight percentages of nitric and sulfuric acid may be used in this capacity, although mixed nitric and sulfuric acid in a ratio more closely approximating 33 per cent nitric acid by weight is more desirable. Since two molecular proportions of nitric acid are stoichiometrically required to react with one molecular proportion of an alpha-(halomethyl)-benzyl alcohol to form an alpha-(halomethyl)-nitrobenzyl nitrate, greater than two molecular proportions of nitric acid are preferably employed. High yields and conversions to alpha-(halomethyl)nitrobenzyl nitrates have been obtained when carrying out the nitration with essentially anhydrous mixed nitric and sulfuric acid as hereinbefore described in a mole ratio of nitric acid to the alpha-(halomethyl)benzyl alcohol compound of only 2.1 to 1.

It is generally desirable to employ solvents in the process of the invention even though benzyl compounds may sometimes be nitrated in the absence thereof. Typical solvents which may be employed are chloroalkanes which are liquid under reaction conditions, such as methyl chloroform, carbon tetrachloride, chloroform, and methylene chloride. By the use of these solvents, benzyl compounds which are solids at the temperature of the reaction may conveniently be added to the nitration vessel. Solvents also aid in the nitration by bringing the reactants into more intimate contact. In general, a large enough proportion of solvent is employed to maintain the benzyl compound in solution at the temperature of the reaction. Sufficient solvent to maintain solubility of all reactants may sometimes be desirable when essentially anhydrous nitric acid itself is the nitrating agent. A large excess of solvent is to be avoided, however, since no useful result is obtained.

The nitration of benzyl compounds is usually conducted at temperatures below 50° C. with temperatures below 30° C. preferred. Since the reaction is exothermic, it is necessary to remove the heat of reaction, e. g. by indirect contact with a heat exchange liquid cooled to the temperature of the reaction and circulated through or around the reaction vessel. The rate at which benzyl compounds are brought into contact with the nitrating acid is preferably as rapid as the heat of reaction can be dissipated and the desired reaction temperature maintained. In carrying out the process of the invention, the optimum conditions for the nitration of any particular starting material may be determined by trial.

Although the nitration may be carried out in iron equipment, the reaction is preferably conducted in equipment which is resistant to the corrosive action of nitric acid, e. g., a glass flask, vitreous-lined, or stainless steel vessel, etc. Thorough mixing of the reactants is highly desirable throughout the nitration and is readily provided with the usual type of mixing equipment.

The nitration of benzyl compounds according to the invention is rapid and lends itself readily and conveniently to continuous operation. Continuous nitrations have been conducted in accord with the invention in which the conversions and yields are very comparable to batch nitrations. In general, a continuous process is to be desired since it requires smaller reactor inventories than batch reactions and consequently affords safer operation.

Product purification is primarily concerned with the separation of nitrobenzyl nitrates, since it is generally desirable to employ a sufficient quantity of nitrating acid to nitrate alpha-(halomethyl)benzyl alcohols preponderantly to the corresponding nitro-nitrates. The manner in which the organic products are worked up depends somewhat on the quantity of residual acid and organic solvent contained therein. When a large excess of acid is employed and the total product distributes itself into layers, the acid layer may be separated and reemployed in the nitration reaction. The organic layer is then usually washed with an excess of water to remove residual acid and water soluble impurities. However, when only a slight excess of acid is employed or when the reaction product is a single phase, it is usually desirable to drown the total product in water. The alpha-(halomethyl)-para-nitrobenzyl nitrates may usually be crystallized directly from the water washed product, e. g. by fractional crystallization, leaving behind an oily filtrate containing mixed nitrobenzyl nitrate isomers. It may be desirable, particularly when an excess of solvent is employed, to first remove the bulk of the solvent by flash distillation and then recover the para-nitrobenzyl nitrate compound by fractional crystallization. Crude alpha-(halomethyl)-para-nitrobenzyl nitrate compounds, due to their thermal instability, are purified by recrystallization from organic solvents rather than by distillation.

The general formula for the nitrated compounds of the invention was established only after extensive analyses. For example, alpha-(bromomethyl)-para-nitrobenzyl nitrate was analyzed for weight per cent composition by combustion analysis and X-ray absorption analysis. Its molecular weight was determined by boiling point elevation in acetone. The empirical formula $C_8H_7N_2O_5Br$ was confirmed by X-ray absorption analysis. The presence of a nitrate group in the side chain and a nitro group in the para position of the ring was established by infrared absorption.

The purified alpha-(halomethyl)-para-nitrobenzyl nitrates of the invention as hereinbefore mentioned are usually white to light yellow crystalline solids melting below 150° C. For example, alpha-(bromomethyl)-para-nitrobenzyl nitrate recrystallized from benzene is a light yellow crystalline solid melting at 100° to 102° C. and is isomorphous with alpha-(chloromethyl)-para-nitrobenzyl nitrate recrystallized from carbon tetrachloride melting at 77° to 79° C.

Some of the new alpha-(halomethyl)nitrobenzyl nitrates prepared according to the process of the invention may also be produced by the nitration of (1,2-dihaloethyl)benzene compounds according to the method disclosed in our co-pending application Serial No. 291,304, filed simultaneously herewith.

The present invention is illustrated but not limited by the following examples.

Example 1

Alpha-(bromomethyl)benzyl alcohol was nitrated in a glass flask equipped with reflux condenser, thermometer, dropping funnel, and motor driven stirrer. The flask was charged with 407 grams of essentially anhydrous nitric acid (specific gravity 1.591 at 29° C.) which was agitated and cooled to −8° C. by partly immersing the flask in a Dry Ice bath of carbon tetrachloride and chloroform. During a period of 14 minutes, 200 grams of alpha-(bromomethyl)benzyl alcohol dissolved in 400 grams of methylene chloride was added to the nitric acid in the flask. The resulting total reaction product was poured over 300 grams of cracked ice and stirred vigorously. The organic layer was separated and shaken in a separatory funnel with two portions of water of 200 ml. each. The washed organic product was then transferred to a flask where the methylene chloride was flashed off under vacuum at room temperature. The solvent-free product weighed 271 grams and was found by infrared analysis to contain approximately 70 weight per cent alpha-(bromomethyl)-para-nitrobenzyl nitrate. The remainder of the product was chiefly the meta isomer. From 168 grams of the solvent-free product there was obtained by fractional crystallization, 144 grams of crude solid alpha-(bromomethyl)-para-nitrobenzyl nitrate. By recrystallizing 138 grams of this crude solid in carbon tetrachloride and drying in a desiccator at 2 millimeters mercury absolute pressure, 103 grams of purified crystalline alpha-(bromomethyl)-para-nitrobenzyl nitrate melting at approximately 100° C. was obtained.

Example 2

The nitration of alpha-(chloromethyl)benzyl alcohol was conducted in equipment similar to that employed in Example 1. Into the reaction flask was charged 500 grams of methylene chloride and 514 grams of anhydrous mixed acid composed of 50—50 weight per cent nitric and sulfuric acid. To the agitated mixture cooled to −5° C. was added dropwise 156.5 grams of alpha-(chloromethyl)benzyl alcohol during a period of 10 minutes. The mole ratio of nitric acid to alpha-(chloromethyl)benzyl alcohol represented by the above weights is approximately 4:1. The reaction product was poured over cracked ice and the organic portion separated therefrom. The crude organic product was given three successive water washes and the methylene chloride was removed at reduced pressure on a steam bath. From the resultant product amounting to 230 grams there was obtained, by fractional crystallization and filtration, 115 grams of viscous oil and 112 grams of a crude crystalline solid. The oil consisted of mixed alpha-(chloromethyl)nitrobenzyl nitrate isomers, chiefly the meta isomer. The crude solid, identified as chiefly alpha-(chloromethyl)-para-nitrobenzyl nitrate, was recrystallized from carbon tetrachloride. The resultant white crystals melted at 77–79° C. Examination of the crystals by X-ray diffraction analysis showed them to be isomorphous with alpha-(bromomethyl)-para-nitrobenzyl nitrate recrystallized from benzene. The purified alpha-(chloromethyl)-para-nitrobenzyl nitrate was observed to have the following weight per cent composition:

|  | Observed | Theory |
|---|---|---|
| Percent Carbon | 38.85 | 38.96 |
| Percent Hydrogen | 2.55 | 2.86 |
| Percent Nitrogen | 10.43 | 11.36 |
| Percent Chlorine | 14.60 | 14.38 |

*Example 3*

The nitration of alpha-(bromomethyl)-m-methylbenzyl alcohol was carried out in equipment similar to that described in Example 1. The reaction flask was charged with 179 grams of essentially anhydrous nitric acid and 235 grams of methylene chloride. Thereafter 155 grams of alpha-(bromomethyl)-m-methylbenzyl alcohol was added dropwise to the agitated contents of the reaction vessel cooled to approximately —5° C. The reaction product was poured over 150 grams of cracked ice and the organic layer was thereafter washed with water. Methylene chloride was then removed from the washed organic layer at reduced pressure on a steam bath. An oily product weighing 185.5 grams was obtained which was found by infrared analysis to contain approximately 60 per cent by weight of alpha-(bromomethyl)-m-methyl-x-nitrobenzyl nitrate.

Most of the above described oily product was renitrated according to the foregoing general procedure. However, instead of anhydrous nitric acid, the nitrating agent consisted of 464 grams of nearly anhydrous mixed acid containing approximately equal weight percentages of nitric and sulfuric acid. In addition to the acid, 464 grams of methylene chloride was charged into the reaction flask. A portion of the oily product weighing 174 grams was gradually added to the contents of the flask cooled and maintained at about —5° C. during a period of 19 minutes. The reaction product was poured over 600 grams of cracked ice. The water-washed organic layer separating therefrom weighed 591 grams. After removing methylene chloride at low temperature and reduced pressure, the crude organic product weighing 191 grams was cooled to room temperature. Crystals which formed therein were removed by filtration. A second and third crop of crystals were likewise obtained and an oily filtrate remained. X-ray diffraction analysis of the crystalline solid showed the presence of two different phases. By recrystallizing the solid repeatedly from carbon tetrachloride and toluene, a compound with a melting point of 76° to 77° C. and another with a melting point of 134° to 135° C. were separated. The higher melting solid consisting of 10 per cent by weight of the solvent-free organic product was alpha-(bromomethyl)-5-methyl-2-nitrobenzyl nitrate. The solid melting at 76° to 77° C. comprising 55 per cent of the product was alpha-(bromoethyl)-3-methyl-4-nitrobenzyl nitrate. The latter compound was oxidized with nitric acid to 3-methyl-4-nitrobenzoic acid melting at 213° to 215° C.

*Example 4*

The nitration of alpha-(bromomethyl)benzyl alcohol was carried out batch-wise in larger equipment than that employed in the preceding examples. The nitration vessel consisted of a ten gallon jacketed Pfaudler reactor equipped with a motor-driven stirrer. Into the reactor was pumped 38.5 pounds of nearly anhydrous mixed acid containing approximately 50—50 weight per cent nitric and sulfuric acid. In addition, 11.0 pounds of 96 weight per cent sulfuric acid was also pumped into the reactor. Agitation was applied to the reaction vessel and the mixed acid was cooled to about 0° C. with calcium chloride brine circulated through the jacket of the nitrator. A solution of 20.1 pounds of alpha-(bromomethyl)-benzyl alcohol in 40 pounds of carbon tetrachloride was then pumped into the nitrator at such a rate as to maintain the reaction temperature at about 10° C. The time required was about 4.75 hours. Approximately 2 pounds of carbon tetrachloride was then pumped into the reactor to flush out the lines and insure the addition of all of the alpha-(bromomethyl)-benzyl alcohol. The reaction mixture was agitated for an additional quarter of an hour and then poured into a 30 gallon ceramic vessel filled to one third its height with chipped ice. The mixture was agitated in the ceramic container until all of the ice had melted. After the reaction mixture had separated into layers, the upper acid layer was withdrawn and discarded. The lower oil layer, containing solid alpha-(bromomethyl)-para-nitrobenzyl nitrate, was filtered in a stoneware vacuum filter. The solid product was first washed with water and then with about 4 pounds of carbon tetrachloride. The washed product was dried for 36 hours at room temperature in an oven equipped with an air blower. The dry alpha-(bromomethyl)-para-nitrobenzyl nitrate weighed 13.94 pounds. Based on alpha-(bromomethyl)benzyl alcohol, the yield of alpha-(bromomethyl)-para-nitrobenzyl nitrate melting from 92° to 95° C. was 47.7 weight per cent.

We claim:

1. Alpha-(halomethyl)nitrobenzyl nitrate compounds with the general formula:

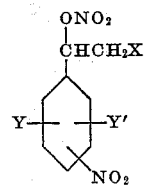

wherein X is a member of the group consisting of bromine and chlorine, and Y and Y' are independently selected from the group consisting of hydrogen, halogen, lower alkyl, and lower alkoxy, each of said lower alkyl and lower alkoxy groups containing no more than 5 carbon atoms.

2. Alpha-(chloromethyl)-p-nitrobenzyl nitrate having the following formula:

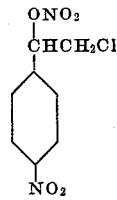

3. Alpha-(bromomethyl)-p-nitrobenzyl nitrate having the following formula:

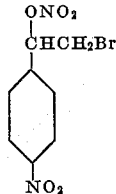

4. Alpha-(bromomethyl)-3-methyl-4-nitrobenzyl nitrate having the following formula:

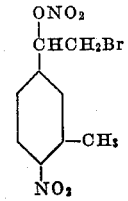

5. Alpha-(bromomethyl)-5-methyl-2-nitrobenzyl nitrate having the following formula:

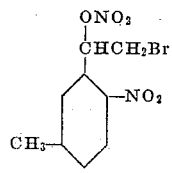

6. In a method of preparing alpha-(halomethyl)nitrobenzyl nitrate compounds with the general formula:

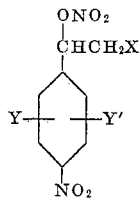

wherein X is a member of the group consisting of bromine and chlorine, and Y and Y' are independently selected from the group consisting of hydrogen, halogen, lower alkyl, and lower alkoxy, each of said lower alkyl and lower alkoxy groups containing no more than 5 carbon atoms, the step which comprises reacting at a temperature below 50° C., an organic compound corresponding to the general formula:

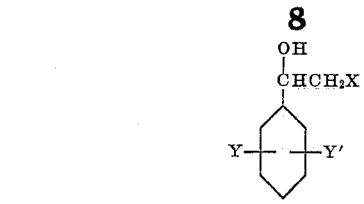

wherein X, Y, and Y' are as defined above and the para position of the ring is unsubstituted, with a nitrating agent containing at least two molecular proportions of nitric acid for each mole of the organic compound to be nitrated, said nitrating agent containing less than 10 weight per cent water.

7. A method according to claim 6 wherein the nitrating agent is nitric acid.

8. A method according to claim 6 wherein the nitrating agent is a mixture of nitric and sulfuric acids.

9. A method according to claim 6 wherein the reaction is carried out in a solvent medium consisting of a chloroalkane which is a liquid under reaction conditions.

References Cited in the file of this patent

Woodcock: "J. Chem. Soc." (1949), pp. 203–207.
Lutz et al.: "J. Org. Chem.," vol. 12 (1947), pp. 676–686.
Arndt et al.: "Ber. deut. Chem.," vol. 61 (1928), pp. 1111 and 1112.